(12) United States Patent
Wiryaman et al.

(10) Patent No.: US 7,010,611 B1
(45) Date of Patent: Mar. 7, 2006

(54) BANDWIDTH MANAGEMENT SYSTEM WITH MULTIPLE PROCESSING ENGINES

(75) Inventors: Santa Wiryaman, Lexington, MA (US); David A. Romrell, Hillsboro, OR (US)

(73) Assignee: Converged Access, Inc., Billerica, MA (US)

( * ) Notice: Subject to any disclaimer, the term of this patent is extended or adjusted under 35 U.S.C. 154(b) by 880 days.

(21) Appl. No.: 09/612,635

(22) Filed: Jul. 7, 2000

Related U.S. Application Data

(60) Provisional application No. 60/171,321, filed on Dec. 21, 1999.

(51) Int. Cl.
*G06F 15/16* (2006.01)
*H04L 12/26* (2006.01)

(52) U.S. Cl. .............. 709/232; 709/233; 709/234; 370/232

(58) Field of Classification Search ........ 709/232–234, 709/226, 223; 370/231–234
See application file for complete search history.

(56) References Cited

U.S. PATENT DOCUMENTS

| | | | |
|---|---|---|---|
| 4,445,116 A | | 4/1984 | Grow |
| 5,748,629 A | | 5/1998 | Caldera et al. |
| 5,802,106 A | | 9/1998 | Packer |
| 5,987,502 A | * | 11/1999 | Banks et al. ............. 709/203 |
| 6,018,516 A | | 1/2000 | Packer |
| 6,038,216 A | | 3/2000 | Packer |
| 6,046,980 A | * | 4/2000 | Packer ..................... 370/230 |
| 6,353,616 B1 | * | 3/2002 | Elwalid et al. ........... 370/443 |
| 6,519,636 B1 | * | 2/2003 | Engel et al. ............. 709/223 |
| 6,538,989 B1 | * | 3/2003 | Carter et al. ............ 370/229 |

FOREIGN PATENT DOCUMENTS

| | | |
|---|---|---|
| EP | 0 774 848 A2 | 5/1997 |
| WO | WO 99/13624 | 3/1999 |

OTHER PUBLICATIONS

EP Patent Application No. 0 774 848 A2 to Lyles, Joseph B. published on May 5, 1997.*
Floyd S. et al., "Link-Sharing and Resource Management Models for Packet Networks", *IEEE/ACM Transactions on Networking*, vol. 3, No. 4, Aug. 1995, pp. 365-386.
Pazos, C.M. et al., "Flow Control and Bandwidth Management in Next Generation Internets" *IEEE*, Jun. 22, 1998, pp. 123-132.
Karandikar, Shrikrishna et al., "TCP Rate Control", undated, *Department of ECSE, Department of Computer Science, Rensselaer Polytechnic Institute*, pp. 1-13.
Cho, Kenjiro, "A Framework for Alternate Queuing: Towards Traffic Management by PC-UNIX Based Routers", undated, *Sony Computer Science Laboratory, Inc.*, pp. 1-12.
Risso, Fulvio et al., "Operational and Performance Issues of a CBQ router", undated, *Department of Computer Science, University College London*.
Braun, Torsten, "IPnG: Neue Internet-Dienste und virtuelle Netze: Protokolle, Programmiering und Internetworking", Dpunkt Verlag, Ringstrasse 19, D-69115 Heidelberg, Mar. 1999, XP-002175995.

* cited by examiner

*Primary Examiner*—Ario Etienne
*Assistant Examiner*—Sahera Halim
(74) *Attorney, Agent, or Firm*—Fish & Richardson P.C.

(57) ABSTRACT

A method of managing bandwidth including receiving packets on an input port, classifying the packets in a classification engine, processing the packets in a processing engine, queuing the packets in a queuing engine, and scheduling the packets on an output port.

34 Claims, 5 Drawing Sheets

BANDWIDTH MANAGEMENT SYSTEM WITH MULTIPLE PROCESSING ENGINES

CLAIM OF PRIORITY

This application claims priority from co-pending provisional application Ser. No. 60/171,321, filed on Dec. 21, 1999, which is incorporated by reference herein.

BACKGROUND

This invention relates generally to bandwidth management systems.

Bandwidth management plays a critical part in traffic management of packet networks. Poor bandwidth management can result in congestion, packet loss, and application performance degradation and thus, affect the overall performance of a network. Bandwidth generally refers to the transmission capacity of a computer channel or communications line or bus, usually stated in bits per second (bps). Bandwidth indicates the theoretical maximum capacity of a connection, but as the theoretical bandwidth is approached, negative factors such as transmission delay can cause deterioration in quality.

A type of bandwidth management utilizes Class-Based Queuing (CBQ). CBQ provides mechanisms to partition and share a link bandwidth using hierarchically structured classes. CBQ provides a methodology for classifying packets and queuing them according to criteria defined by an administrator to provide differential forwarding behavior for each traffic class. Packets are classified into a hierarchy of classes based on any combination of a set of matching criteria, such as IP address, protocol, and application type. Each class is assigned a bandwidth and a set of priorities.

SUMMARY

In an aspect, the invention features a method of managing bandwidth including receiving packets on an input port, classifying the packets in a classification engine, processing the packets in a processing engine, queuing the packets in a queuing engine, and scheduling the packets on an output port.

In another aspect, the invention features a method of managing bandwidth including classifying network packets according to traffic types for placement in class queues, generating parent classes for each class, allocating parent bandwidths to the parent classes, assigning parent priorities to the parent classes, generating sub-parent classes for each parent class and providing a minimum bandwidth to the sub-parent classes.

One or more of the following features may also be included: A policy manager may provide parameter input for processing and queuing. Parameters may include class bandwidth and class priority.

Embodiments of the invention may have one or more of the following advantages:

The bandwidth management system enhances classification through hashing to avoid the cost of performing a linear search of class filters for each packet.

The system provides a mechanism to change the Type Of Service (TOS) value of all packets classified to a particular class to enable matching packets with underlying applications.

The system provides support for specifying a guaranteed minimum bandwidth for a class by making use of the hierarchical nature of class-based queuing (CBQ) classes.

Admission control, working in conjunction with minimum guaranteed bandwidth, provides a limit to the number of simultaneous flows in a class.

The bandwidth management system enhances CBQ with TCP traffic shaping to enhance fairness among the TCP flows in a class, and to reduce the likelihood of the packets being dropped from the class queue.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further, in detail, in the accompanying drawings, in which.

Like reference symbols in the various drawings indicate like elements.

DETAILED DESCRIPTION

Figure 1:
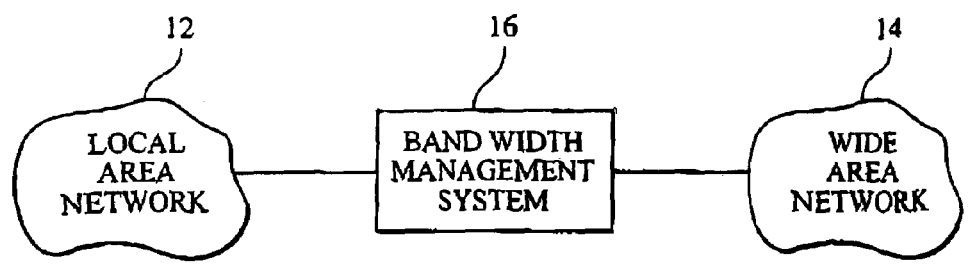
FIG. 1 is a block diagram of a network.

Referring to FIG. 1, a network 10 includes a local area network (LAN) 12 and a wide area network (WAN) 14 connected to a bandwidth management system 16. The bandwidth management system 16 processes network traffic originating from the LAN 12 and WAN 14. More specifically, the bandwidth management system 16 manages: LAN traffic destined for the LAN 12, LAN traffic destined to the WAN 14, and WAN traffic destined for the LAN 12.

Figure 2:
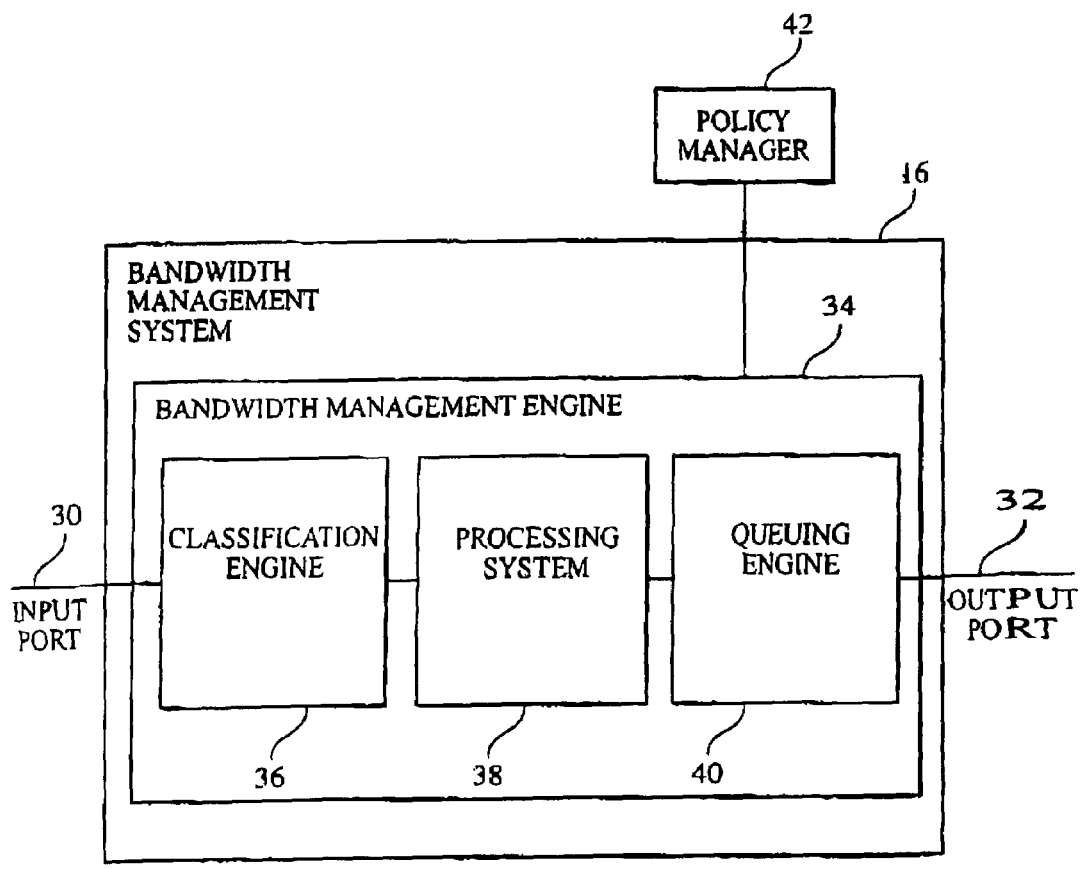
FIG. 2 is a block diagram of a bandwidth management system of FIG. 1.

Referring to FIG. 2, the bandwidth management system 16 (of FIG. 1) includes an input port 30 and an output port 32 connected to a bandwidth management engine 34. Network packets (not shown) arriving through the input port 30 enter a classification engine 36. Classified packets leave the classification engine 36 and enter a processing system 38. Processed packets leave the processing system 38 and enter a queuing engine 40 for scheduling out the output port 32. The bandwidth management system 16 may receive input from a policy manager 42. The policy manager 42 is an input device that is able to provide a bandwidth and a priority to the bandwidth management system 16. Receipt of a bandwidth and priority from the policy manager 42 automatically sets (1) class parameters utilized in the processing system 38 and the queuing engine 40, such as bandwidth, priority, burst, scheduling time, and (2) classification criteria utilized in the classification engine 36 (more fully described below).

In an embodiment, the LAN 12 and WAN 14 of FIG. 1 have input and output ports. In this embodiment, there are two bandwidth management systems 16, one for the LAN to WAN direction, and the other for the WAN to LAN direction. The two systems share a common policy manager 42.

Figure 3:
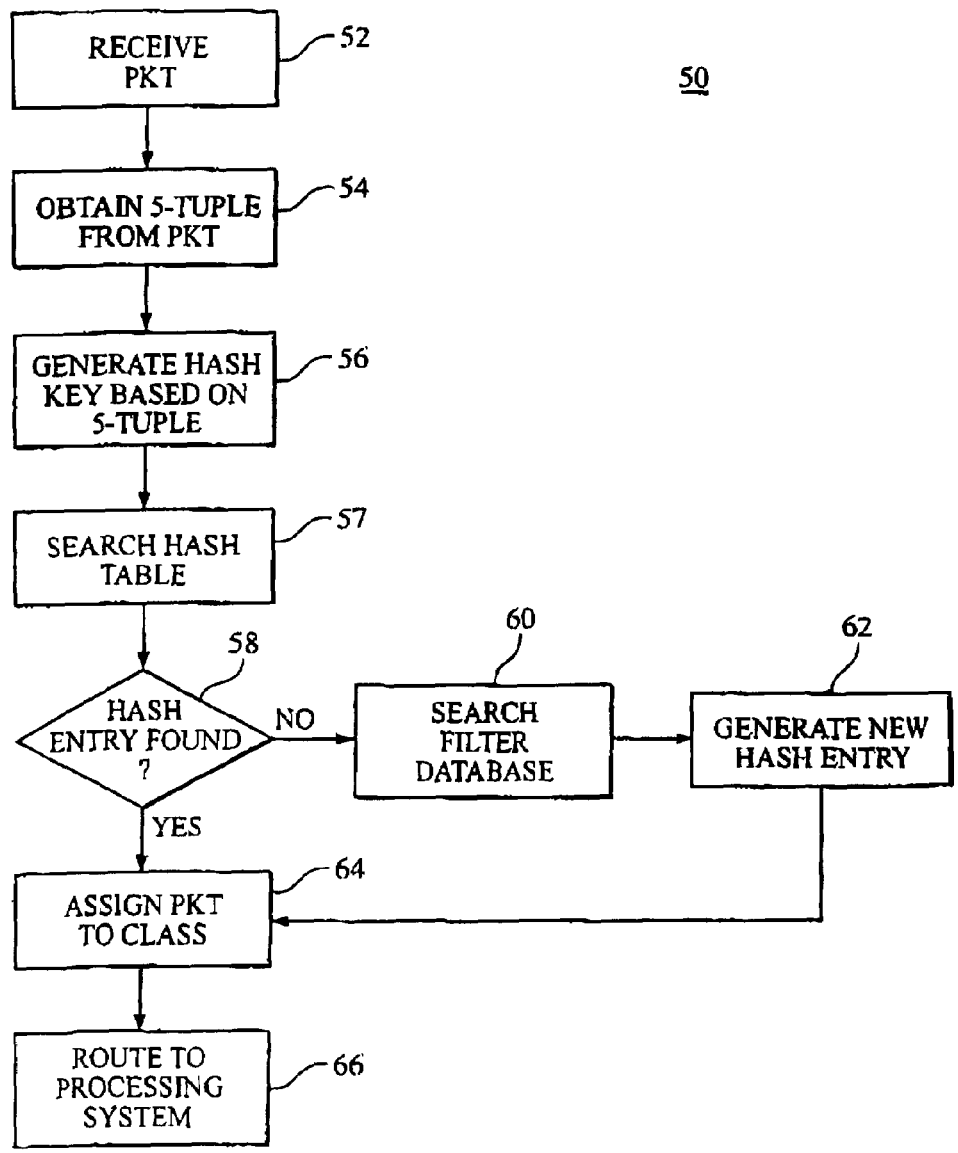
FIG. 3 is a flow diagram of a classification process residing in the bandwidth management system.

Referring to FIG. 3, a classification process 50 residing in the classification engine 36 includes receiving 52 network packets. From each network packet, a 5-tuple is obtained 54. Each 5-tuple includes attributes found in network packets. Specifically, the 5-tuple is a combination of destination address, destination port, source address, source port and protocol. A hash function is applied 56 to generate a hash key k based on the 5-tuple. The $k^{th}$ list in the hash table is searched 57 for a hash entry that matches the packet's 5-tuple. A determination 58 is made whether such hash entry is found. If the hash entry is not found, the process 50 sequentially searches 60 the filter database for a match of the 5-tuple. A new hash entry is generated 62, containing the packet's 5-tuple and the class associated with the found filter, and the network packet assigned 64 to the found class. If a hash entry is found, the process 50 assigns 64 the packet to the class associated with the hash entry. Classified packets are routed 66 to the processing system 38 for further processing.

In an embodiment, the hash function referred to above returns a key, which is an index to a hash table. Hash_table [key] includes a list of hash entries containing: the entry's source address (src), source port (src_port), destination address (dst), destination port (des_port), protocol, origin, and a class pointer. The hash entry search iterates on the Hash_table[key] list, searching for a hash entry that matches the packet's src, src_port, dst, dst_port, protocol, and origin. If there is a match, the class pointer of the matched hash entry points to the designated class for this packet. If there is no match, than it goes through the filter table looking for a match.

Figure 4:
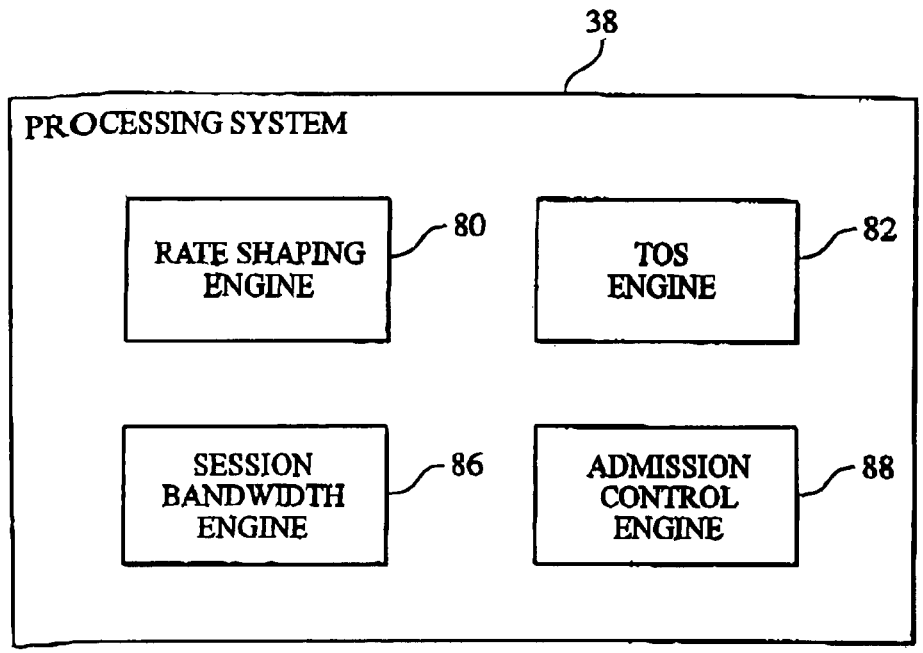
FIG. 4 is a block diagram of a processing system residing in the bandwidth management system.

Referring to FIG. 4, the processing system 38 includes a rate shaping engine 80, a TOS engine 82, a session bandwidth engine 86, and an admission control engine 88. Not all packet processing needs all engines 80–88. Each of the engines 80–88 may be dynamically added or removed from the processing system 38 as user requirements change.

A type of service (TOS) field in an IP network packet is used to set precedence for the packet. The TOS field is used by different types of applications, such as differentiated services and multi protocol label switching (MPLS) routers capable of mapping the differentiated services code point to MPLS labels. At present there is no consistent definition of TOS values among these applications. The TOS engine 82 provides a mechanism to change the TOS value of all packets classified to a particular class. Rather than complying with a specific application, the user of the TOS engine 82 has the ability to change the TOS value to match with any underlying application. A new TOS value and a mask are supplied to change specific bits in the TOS field. It is the responsibility of the user of the TOS engine 82 to match the TOS setting to suit his or her purposes.

Transmission Control Protocol (TCP) uses a sliding window flow-control mechanism to increase throughput over wide area networks. TCP allows the sender to transmit multiple packets before it stops and waits for an acknowledgment (ACK). The sender does not have to wait for an ACK each time a packet is sent. The sender then fills the pipe and waits for an ACK before sending more data. The receiver not only acknowledges that it got the data, but advertises how much data it can now handle, that is, it's window size. This is done using the Window field. The sender is then limited to sending no more than a value of Window bytes of unacknowledged data at any given time. The receiver sets a suitable value for the Window based on the amount of memory allocated to the connection for the purpose of buffering data.

Queuing is important to network traffic management. Systems utilizing class-based queuing (CBQ), for example, exhibit competition for bandwidth in each CBQ class. Given the bursty nature of TCP connections, a connection can be "starved" by a large burst from other connections. Further, a large burst from a connection may also cause packets (from this or other connections) to be dropped from a class queue, which has a limited size. The processing system 38 enhances CBQ by including a TCP traffic shaping (also known as rate shaping) process in the TCP rate-shaping engine 80. The TCP rate-shaping engine 80 minimizes the likelihood of packets being dropped from the class queue, and enhances fair allocation of the queue among multiple connections with different levels of burstiness. TCP rate shaping is applied to all TCP connections as a secondary means for bandwidth management.

To control burst, the TCP rate-shaping engine 80 reduces the size of the burst by reducing the advertised window size that is sent by the receiver in two ways depending on whether the class assigned to the packet may borrow.

When the class cannot borrow, i.e., its bandwidth allocation is static, the rate shaping engine uses the formula C=B/(n)(D), where C is the capacity of the class, B is the class bandwidth, n is the number of concurrently active connections, and D is the estimate of the round trip time of the connection. The reduced window size is then set to C rounded up to be a multiple of the connection maximum segment size (MSS), if this is less than the original advertised window size, or left unchanged otherwise. D is obtained from running a weighted average of round trip time samples made throughout the lifetime of a TCP connection.

When a class can borrow excess bandwidth from its parent, the effective bandwidth for this class might exceed its class bandwidth. Therefore, if the TCP rate-shaping engine 80 reduces the window size according to the class bandwidth, it might potentially limit the borrowing ability of this class.

For the above reason, when a class can borrow, the TCP rate shaping engine 80 reduces the advertised window size using the formula C=B'/(n)(D), where B' is the maximum of class bandwidth and burst bandwidth. The burst bandwidth of a class is the maximum amount of bandwidth this class can borrow.

Figure 5:
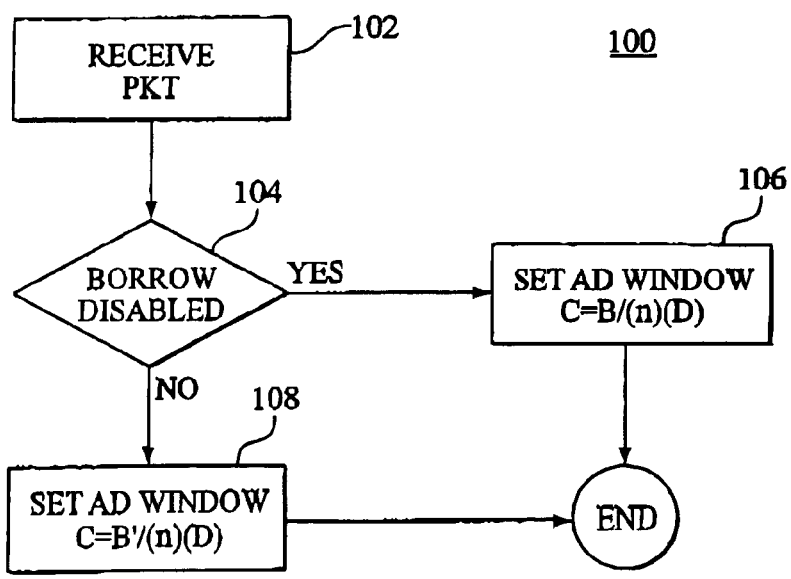
FIG. 5 is a flow diagram of a rate shaping process residing in the bandwidth management system.

Referring to FIG. 5, a rate shaping process 100 residing in the rate-shaping engine 80 includes receiving 102 a packet. A determination 104 is made whether class borrowing is enabled for the class assigned to the packet. If class borrowing is disabled, the advertised window size is set 106 to a value calculated by the formula C=B/(n)(D), where B is the class bandwidth, n is the number of currently active connections, and D is the estimate of the round trip time of the connection. If class borrowing is enabled, the advertised window size is set 108 to a value calculated by the formula C= B'/(n)(D), where B' is the maximum of class bandwidth and burst bandwidth.

As mentioned above, general class base queuing (CBQ) provides a mechanism to classify connections to a particular class and pre-allocate an aggregate bandwidth for this class. Connections classified to this class compete for class bandwidth. For some connections, it is desirable to be able to specify a per-connection bandwidth, i.e., a guaranteed minimum bandwidth.

The session bandwidth engine 86 provides a guaranteed minimum bandwidth to a class. This is enabled by the class specification of a minimum bandwidth.

Figure 6:
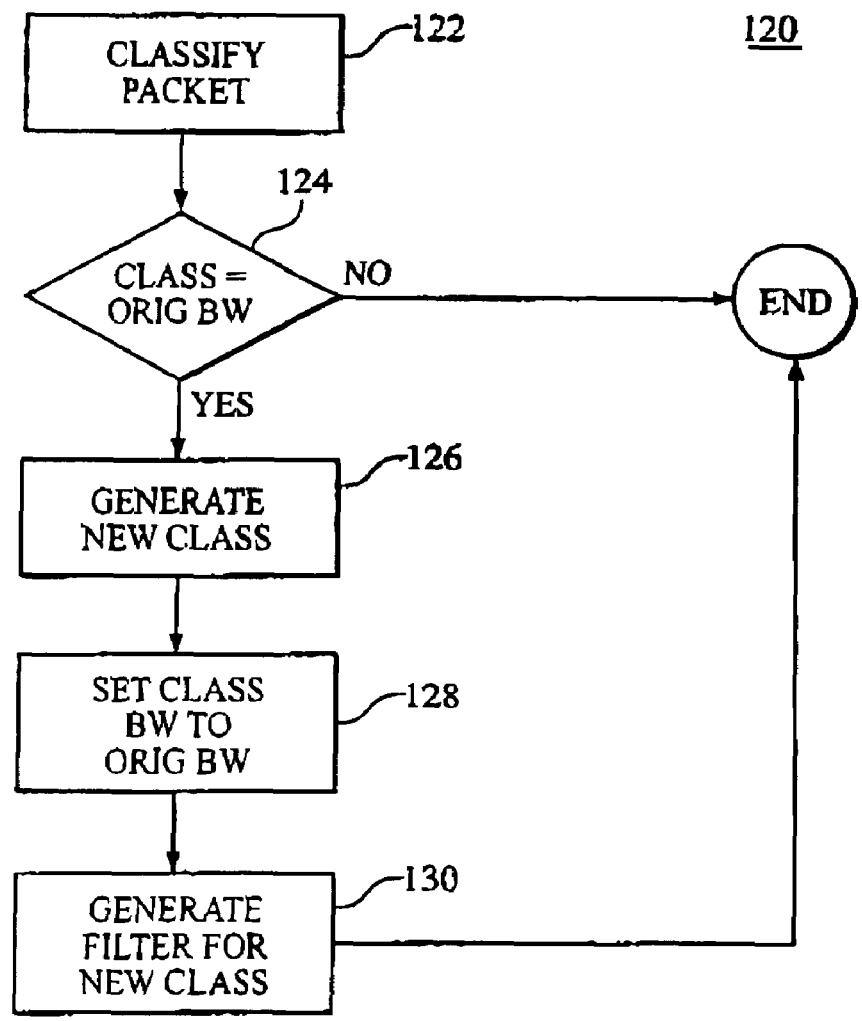
FIG. 6 is a flow diagram of a session bandwidth process residing in the bandwidth management system.

Referring to FIG. 6, a session bandwidth process 120 residing in the session bandwidth engine 86 includes classifying 122 a packet from a particular connection using filter lookup or hash lookup. A determination 124 is made whether the class has a guaranteed minimum bandwidth specified. If the class contains a guaranteed minimum bandwidth specification, a new class is generated 126 for the packet. The new class is said to be a child of the original class. Properties of the new class are inherited from the original class. The class bandwidth of the new class is set 128 to the guaranteed bandwidth of the original class. A filter specifically matching the connection's 5-tuple (a destination address, a destination port, source address, source port) is generated 130 so that subsequent packets from this connection will match this filter instead of the original class filter. Since the dynamically generated class would only contain, at most, one connection, CBQ would guarantee this class to have at least its class bandwidth, or the specified guaranteed bandwidth. The dynamic class is also said to borrow from its parent (the original class). This means the connection of the dynamic class can use excess bandwidth of its parent class.

When a class has a guaranteed minimum bandwidth, the system 16 needs to insure that the number of concurrently active connections (n) in this class times the guaranteed minimum bandwidth does not exceed the class bandwidth. It is possible that the $(n+1)^{th}$ connection would arrive, but there is not enough bandwidth left for the bandwidth management system 16 to guarantee the minimum bandwidth. For this reason, the processing system 38 includes the admission control engine 88.

Admission Control broadly refers to a policy decision applied initially to requests for controlling the admission of network traffic from outside a given administrative domain. Admission control in the admission control engine 88 is enabled using an "admission" directive in a class specification. The types of admission control directives are "squeeze," "deny" or "drop." When the $(n+1)^{th}$ connection arrives and the class has no sufficient bandwidth left to guarantee the minimum bandwidth, then admission control engine 82 activates. If the admission directive is squeeze, the connection is re-classified to match the "default" class of general Class-Based Queuing (CBQ). If the admission directive is drop, the packets from this connection are silently dropped. If the admission directive is deny, and the connection is a TCP connection, the admission control engine 88 generates a TCP reset packet as a reply for the connection request SYN packet. If the connection has to be denied and the protocol used is not TCP then this connection is silently dropped.

Figure 7:
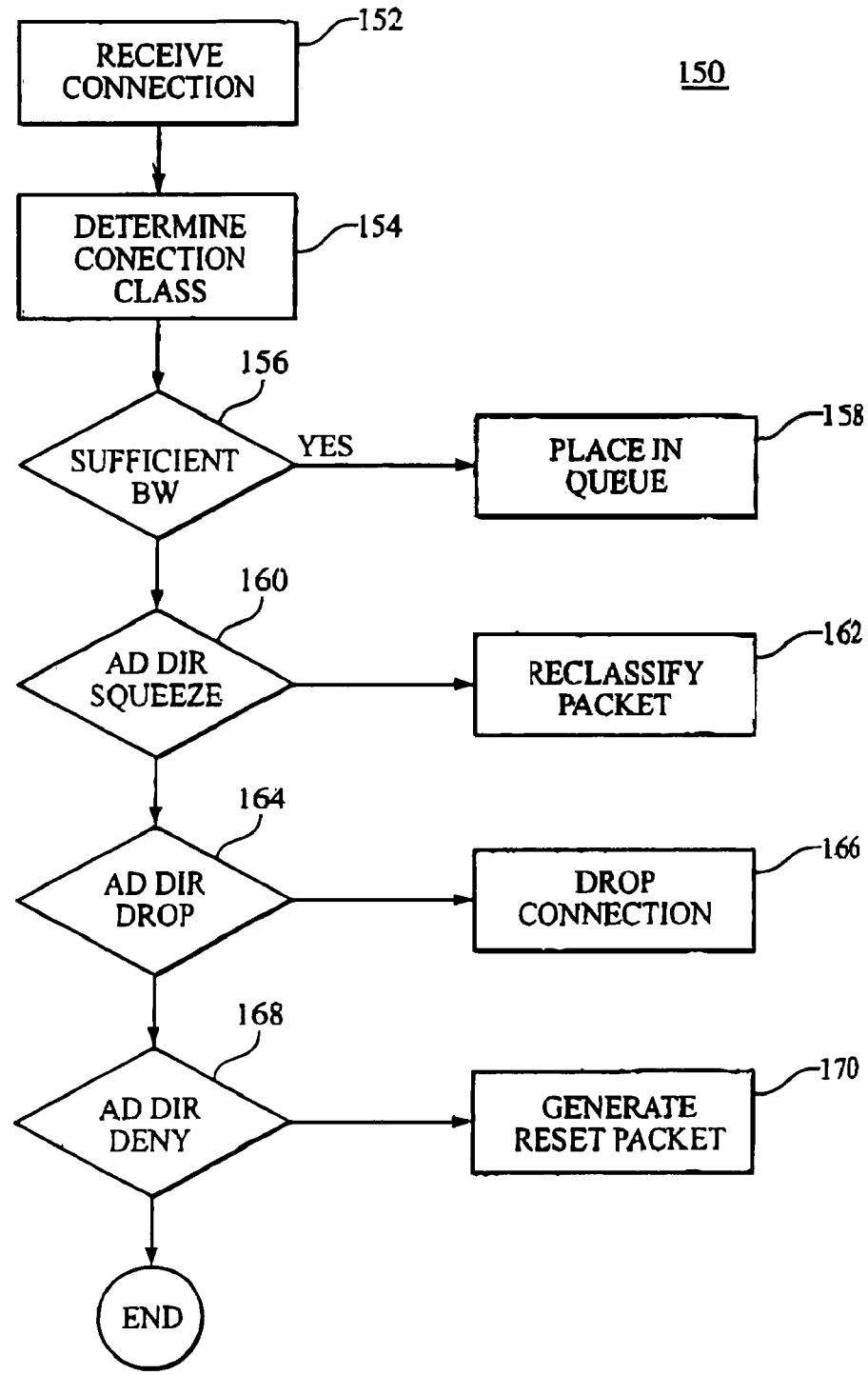
FIG. 7 is a flow diagram of an admission control process residing in the bandwidth management system.

Referring to FIG. 7, an admission control process 150 residing in the admission control engine 88 includes receiving 152 a connection. A determination 154 of the class of the connection is made. A determination 156 is made as to whether there is sufficient bandwidth for the class to guarantee a minimum bandwidth. If there is sufficient bandwidth, the packet is placed 158 in the CBQ queue, following the session bandwidth process 120 (of FIG. 6). If there is not sufficient bandwidth to guarantee minimum bandwidth, a determination 160 is made as to whether the admission directive is squeeze. If the admission directive is squeeze, the packet is reclassified 162 to default class and placed in the CBQ queue through the session bandwidth module. A determination 164 is made as to whether the admission directive is drop or if the traffic is non-TCP. If the admission directive is a drop or the Traffic is non-TCP, then the connection is dropped 166. A determination 168 is made on whether or not the admission directive is deny, the connection is a TCP connection, and the packet is a connection request (SYN) packet 168. If so, a TCP reset packet is generated 170.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of managing bandwidth comprising:
   receiving packets on an input port;
   classifying received packets in a classification engine;
   processing the classified packets in a processing system according to their classifications,
      including selecting processing from a group consisting of at least two of
      session bandwidth packet processing,
      rate shaping packet processing,
      admission control packet processing, and
      type of service (TOS) packet processing; and
   queuing packets in a queuing engine.

2. The computer-implemented method of claim 1 wherein the packets comprise network packets.

3. The computer-implemented method of claim 2 wherein the network packets comprise traffic types.

4. The computer-implement method of claim 3 wherein the traffic types comprise wide area network (WAN) traffic destined for a local area network (LAN).

5. The computer-implemented method of claim 3 wherein the traffic types comprise local area network (LAN) traffic destined for a wide area network (WAN).

6. The computer-implemented method of claim 1 wherein classifying comprises:
   generating hash values based on components of the network packets; and
   determining corresponding classes for the hash values.

7. The computer-implemented method of claim 6 wherein the components comprise 5-tuples.

8. The computer-implemented method of claim 7 wherein the 5-tuples comprise destination addresses, destination ports, source addresses, source ports and protocol numbers.

9. The computer-implemented method of claim 1 wherein processing comprises rate shaping packet processing.

10. The computer-implemented method of claim 9 wherein rate-shaping processing comprises:
    determining whether class borrowing is enabled for the class assigned to the packet;
    determining an advertised window size for a class that has class borrowing disabled by the algorithm:

$$C=B/(n)(D)$$

where C is the capacity of the class, B is the class bandwidth, n is the number of currently active connections and D is an estimate of round trip time of the connection; and
    determining an advertised window size for a class that has class borrowing enabled by the algorithm:

$$C=B'/(n)(D)$$

where B' is the maximum of class bandwidth and burst bandwidth.

11. The computer-implemented method of claim 1 wherein processing comprises session bandwidth packet processing.

12. The computer-implemented method of claim 11 wherein session bandwidth packet processing comprises:

generating a new class for the packet class if a packet class specifies a guaranteed minimum bandwidth;

assigning the new class the guaranteed minimum bandwidth; and generating a 5-tuple filter for the new class.

13. The computer-implemented method of claim 12 wherein the 5-tuple filter comprises a destination address of the packet, a destination port of the packet, a source address of the packet, a source port and a protocol of the packet.

14. The computer-implemented method of claim 1 wherein processing comprises admission control packet processing.

15. The computer-implemented method of claim 14 wherein admission control packet processing comprises session:

receiving a connection;

determining a class for the connection;

determining whether there is sufficient bandwidth for the class to guarantee a minimum bandwidth;

determining an admission directive from the class; and processing the packets in the connection in response to the admission directive.

16. The computer-implemented method of claim 15 wherein the admission directive is squeeze.

17. The computer-implemented claim of 16 wherein processing comprises reclassifying the packet to a default class.

18. The computer-implemented method of claim 15 wherein the admission directive is drop.

19. The computer-implemented claim of 18 wherein processing comprises dropping the connection.

20. The computer-implemented method of claim 15 wherein the admission directive is deny.

21. The computer-implemented claim of 20 wherein processing comprises generating a reset packet.

22. The computer-implemented method of claim 1 wherein processing comprises type of service (TOS) packet processing.

23. The computer-implemented method of claim 22 wherein TOS packet processing comprises changing TOS values to match underlying application.

24. The computer-implemented method of claim 1 wherein processing comprises:

session bandwidth packet processing;

rate shaping packet processing;

admission control packet processing; and type of service (TOS) packet processing.

25. The computer-implemented method of claim 1 wherein queuing comprises placing processed packets in queues according to classes.

26. The computer-implemented method of claim 1 further comprising receiving parameters from a policy manager.

27. The computer-implemented method of claim 26 wherein the parameters comprise a class bandwidth and a class priority.

28. The computer-implemented method of claim 1 further comprising:

queuing the processed packets in a queuing engine; and scheduling the queued packets on an output port.

29. The computer-implemented method of claim 1 wherein processing the classified packets includes selecting processing from a group consisting of session bandwidth packet processing, rate shaping packet processing admission control packet processing, and type of service (TOS) packet processing.

30. A bandwidth management system comprising:

an input port, the input port connected to a classification engine;

a processing engine, the processing engine connected to the classification engine, wherein the processing engine comprises at least two of a session bandwidth engine, a rate-shaping engine, an admission control engine, and a type of service (TOS) processing engine; and a queuing engine connected to the processing engine and to an output port.

31. The bandwidth management system of claim 30 wherein the processing engine comprises:

session bandwidth engine;

a rate-shaping engine;

an admission control engine; and type of service (TOS) processing engine.

32. The bandwidth management system of claim 30 further comprising a policy manager connected to the processing and queuing engine.

33. The bandwidth management system of claim 32 wherein the policy manager is an input device providing parameters.

34. The bandwidth management system of claim 33 wherein the parameters comprise a class bandwidth and class priority.

* * * * *